(12) United States Patent
Edmonds et al.

(10) Patent No.: US 8,458,213 B2
(45) Date of Patent: Jun. 4, 2013

(54) METHOD AND SYSTEM FOR CLASSIFYING QUERIES TO IMPROVE RELEVANCE OF SEARCH RESULTS

(75) Inventors: Kent Andrew Edmonds, San Jose, CA (US); Qian Zhong, San Jose, CA (US); Anjan Goswami, Sunnyvale, CA (US); Muhammad Faisal Rehman, San Jose, CA (US)

(73) Assignee: eBay Inc., San Jose, CA (US)

( * ) Notice: Subject to any disclaimer, the term of this patent is extended or adjusted under 35 U.S.C. 154(b) by 282 days.

(21) Appl. No.: 13/037,182

(22) Filed: Feb. 28, 2011

(65) Prior Publication Data

US 2012/0221557 A1   Aug. 30, 2012

(51) Int. Cl.
*G06F 7/00* (2006.01)
*G06F 17/30* (2006.01)

(52) U.S. Cl.
USPC .......................................... 707/771; 707/731

(58) Field of Classification Search
None
See application file for complete search history.

(56) References Cited

U.S. PATENT DOCUMENTS

| | | | |
|---|---|---|---|
| 2009/0125505 A1* | 5/2009 | Bhalotia et al. | 707/5 |
| 2011/0087655 A1* | 4/2011 | Zhang et al. | 707/725 |
| 2012/0191717 A1* | 7/2012 | Chen et al. | 707/740 |

* cited by examiner

*Primary Examiner* — Uyen T. Le
(74) *Attorney, Agent, or Firm* — Schwegman, Lundberg & Woessner, P.A.

(57) ABSTRACT

Described herein are methods and systems for promoting item listings that satisfy a query based on the item listings being assigned to certain categories. A query to identify a set of item listings is processed where each item listing associated with an item or service being offered for sale and assigned to a leaf-level category. The scope of the query is determined based on a dictionary of queries or a length of the query when the query is not found in the dictionary. One or more categories are identified based on the scope of the query. A search results page is presented with the item listings from the identified one or more categories.

21 Claims, 12 Drawing Sheets

METHOD AND SYSTEM FOR CLASSIFYING QUERIES TO IMPROVE RELEVANCE OF SEARCH RESULTS

TECHNICAL FIELD

The present disclosure generally relates to data processing systems and techniques. More specifically, the present disclosure relates to methods and systems for classifying queries.

BACKGROUND

Advancements in computer and networking technologies have enabled persons to conduct commercial and financial transactions "on-line" via computer-based applications. This has given rise to a new era of electronic commerce (often referred to as e-commerce.) A number of well-known retailers have expanded their presence and reach by operating websites that facilitate e-commerce. In addition, many new retailers, which operate exclusively online, have come in to existence. The business models utilized by enterprises operating online are almost as varied as the products and services offered. For instance, some products and services are offered at fixed prices, while others are offered via various auction methods, and still others are offered via a system of classified ad listings. Some enterprises specialize in the selling of a specific type of product (e.g., books) or a specific service (e.g., tax preparation), while others provide a myriad of categories of items and services from which to choose. Some enterprises serve only as an intermediary, connecting sellers and buyers, while others sell directly to consumers.

Despite the many technical advances that have improved the state of e-commerce, a great number of technical challenges and problems remain. One such problem involves determining how to best present products and services (e.g., items) that are being offered for sale, so as to maximize the likelihood that a transaction (e.g., the sale of a product or service) will occur. For instance, when a potential buyer performs a search for a product or service, it may often be the case that the number of item listings that satisfy the potential buyer's query far exceeds the number of item listings that can practically be presented on a search results page. Furthermore, it is well established that the presentation of an item listing in a search results page—for example, the order or placement of the item listing in a list of listings, the font, font size, or color of the listing, and so on—can affect whether potential buyers select the listing, and ultimately purchase the listed product or service.

For enterprises that serve as an intermediary—for example, by connecting buyers with sellers—it is generally desirable that the presentation of item listings occur in a fair manner that strikes a balance between the needs and desires of the various sellers, the buyers or potential buyers, and the enterprise itself. If a preference is given to one seller, such that the one seller's item listings are consistently being presented in the most prominent position(s) on a search results page, other sellers may not participate, which will ultimately have a negative impact on the enterprise. Similarly, if item listings are presented in accordance with an algorithm that is too rigid and that cannot easily be altered or tweaked, such as a first-listed first-presented algorithm, some sellers may attempt to game the system, again negatively impacting other sellers, the potential buyers' experience, and ultimately the enterprise itself. Furthermore, using a simple and rigid algorithm for presenting item listings prevents the enterprise from optimizing the presentation of item listings to improve the overall conversion rate for item listings. This may lead potential buyers to shop elsewhere, which ultimately will negatively affect the e-commerce enterprise. Finally, any algorithm used in the selection and ranking of search results for presentation to a user should accurately present the items for which a potential buyer is searching.

DESCRIPTION OF THE DRAWINGS

Some embodiments are illustrated by way of example and not limitation in the figures of the accompanying drawings, in which.

DETAILED DESCRIPTION

Methods and systems for ranking a set of search results, based in part on the categories to which an item associated with each search result has been assigned are described. In the following description, for purposes of explanation, numerous specific details are set forth in order to provide a thorough understanding of the various aspects of different embodiments of the present invention. It will be evident, however, to one skilled in the art, that the present invention may be practiced without these specific details.

Described herein are methods and systems for promoting item listings that satisfy a query based on the item listings being assigned to certain categories. A query to identify a set of item listings is processed where each item listing associated with an item or service being offered for sale and assigned to a leaf-level category. The scope of the query is determined based on a dictionary of queries and a length of the query when the query is not found in the dictionary. One or more categories are identified based on the scope of the query. A search results page is presented with the item listings from the identified one or more categories.

Figure 1:
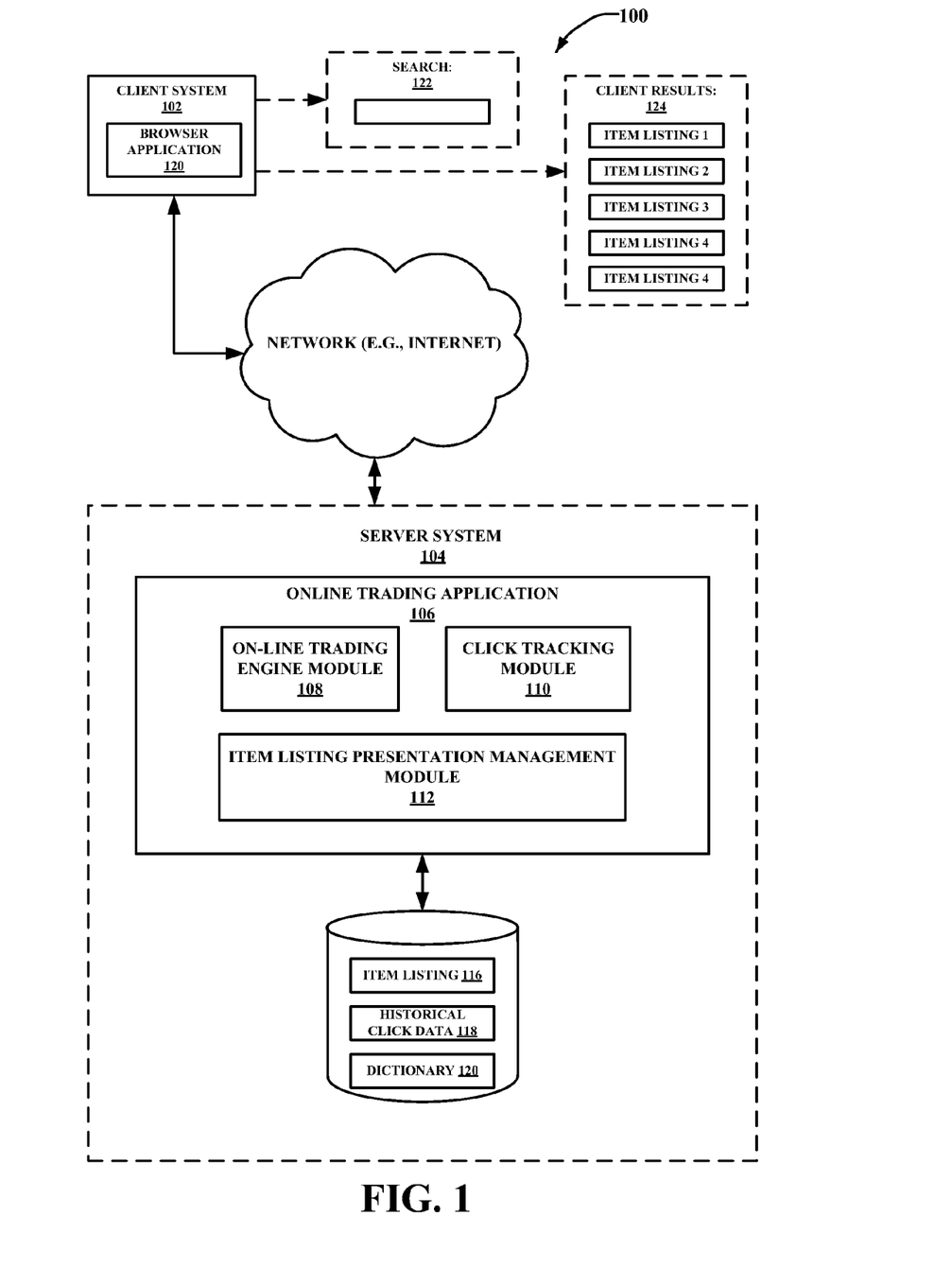
FIG. 1 illustrates a functional block diagram of a network environment for hosting an on-line marketplace or trading application, with which an embodiment of the invention might be implemented.

FIG. 1 illustrates a functional block diagram of a network environment for hosting an on-line marketplace or trading application. In general, the network environment 100 of FIG. 1 includes a client system 102 and a server-based system 104 hosting an on-line trading application 106. As illustrated in FIG. 1, the on-line trading application 106 hosted at the server system 104 is shown to include an on-line trading engine module 108, a click tracking module 110 and an item listing presentation management module 112. Additionally, the on-line trading application is coupled to a database 114 with tables pertaining to item listings 116 and historical click data 118, in addition to other data.

In one embodiment, a user operates a web browser application 120 on a client system 102 to interact with the on-line trading application 106 residing and executing on the server system 104. As illustrated by the example user interface with reference number 120, a user may be presented with a search interface, with which the user can specify one or more search terms to be used in a search request submitted to the on-line trading application 106. In some embodiments, in addition to specifying search terms, users may be able to select certain item attributes, such as the desired color of an item to be searched, and so on. Additionally, in some embodiments, a user may be able to browse items listings by navigating the tree-like hierarchy of categories. In any case, after receiving and processing a search request or category selection (for browsing), the on-line trading application 106 communicates a response to the web browser application 120 on the client system 102. For instance, the response is an Internet document or web page that, when rendered by the browser application 120, displays a search results page 124 showing several item listings that satisfy the user's search request. As illustrated in the example search results page 124, the item listings are arranged or positioned on the search results page in an order determined by the item listing presentation management module 112. The item listings are, in some embodiments, presented by a presentation module, which may be a web server or an application server.

In general, the item listings are presented in the search results page in an order based on a ranking score that is assigned to each item listing that satisfies the query. In some embodiments, the item listings will be arranged in a simple list, with the item listing having the highest ranking score appearing at the top of the list, followed by the item listing with the next highest ranking score, and so on. In some embodiments, several search results pages may be required to present all item listings that satisfy the query. Accordingly, only a subset of the set of item listings that satisfy the query may be presented in the first page of the search results pages. In some embodiments, the item listings may be ordered or arranged in some other manner, based on their ranking scores. For instance, instead of using a simple list, in some embodiments the item listings may be presented one item listing per page, or, arranged in some manner other than a top-down list.

Consistent with embodiments of the invention, the ranking score assigned to each item listing is based on one or more component scores or factors, including a category boost score that reflects a likelihood that some item listings assigned to certain categories are likely to be selected, based on an analysis of historical click data.

In some embodiments, the on-line trading engine module 108 may consist of a variety of sub-components or modules, which provide some of the functions of an on-line trading application 106. As described more completely below, each module may be comprised of software instructions, computer hardware components, or a combination of both. To avoid obscuring the invention in unnecessary detail, only a few of the on-line trading engine functions (germane to the invention) are described herein. For example, the on-line trading engine module 108 may include an item listing management module (not shown) that facilitates the receiving and storing of data representing item attributes, which collectively form an item listing. When a user desires to list a single item, or multiple items, for sale, the user will provide information about the item(s) (e.g., item attributes) and how such items are to be presented for sale (e.g., at a fixed price, or via auction, etc.). Such information may be submitted via one or more forms of one or more web pages, or via drop down lists, or similar user interface elements. The item listing management module receives the item attributes and stores the item attributes together within a database 114 as an item listing 116. In some instances, the item listings may be stored in an item listing database table. In general, the item attributes of each item listing are analyzed to determine a ranking score assigned to item listings and used in determining the position of item listings when the item listings are being presented in a search results page.

When an item listing is first generated, the seller of the item will be prompted to assign the item and/or item listing to a particular category. For example, the user may be presented first with a list of top-level categories from which to select the best top-level category for his or her item. Upon selecting a top-level category, the seller may be presented with a list of Level 1 sub-categories from which to select, until the seller has navigated the hierarchical category tree and "drilled down" to select the best leaf-level category for the item being presented via the item listing. The selection of the category and the associated item listing are stored in a dictionary 120 that enables potential buyers to determine the scope of a search or query (e.g. specific, broad, or ambiguous). In general, the selected category allows potential buyers to identify items by category, for instance, by filtering search results by category, or, by searching or browsing for item listings assigned to a particular category, thereby generally making it easier to identify item listings of interest. The method of generating entries in the dictionary based on a seller listing is described further in FIG. 10.

The click tracking module 110 operates to identify certain user-initiated events and activities. For instance, the click tracking module 110 identifies when a user "clicks" or otherwise selects an item listing assigned to a particular category. In some embodiments, a selection is identified when a potential buyer clicks on an item listing, or manipulates a cursor device to hover over a particular item listing. If, for example, a potential buyer performs a search with the search terms, "iPod touch", the click tracking module will identify which item listings in the search results page that the potential buyer selects for viewing—such event referred to generally as a "view item" event. The click tracking module 110 will identify the leaf-level category to which a selected item listing is assigned, and keep a tally of the number of times an item listing from each leaf-level category is selected for a particular search query, over a particular time frame. This click data is then stored in a database as illustrated in FIG. 1 by the historical click data with reference number 118. Accordingly, for each subsequent search query that is performed with the same search terms, a click probability score for each category can be ascertained from the historical click data 118. The click probability score for a category indicates the likelihood that an item listing assigned to that category will be selected for that particular search query, based on an analysis of historical click data. As described in greater detail below, the click probability score for the corresponding category to which an item listing is assigned is used to determine whether an item listing should be promoted, for instance, by applying a normalized category boost factor in the algorithm used to assign the item listing a ranking score. The resulting increase in the ranking score will affect the item listing's position in the search results page, thereby "surfacing" the search results that are most likely to be of interest to a potential buyer, given the search term or terms entered by the potential buyer.

Figure 2:
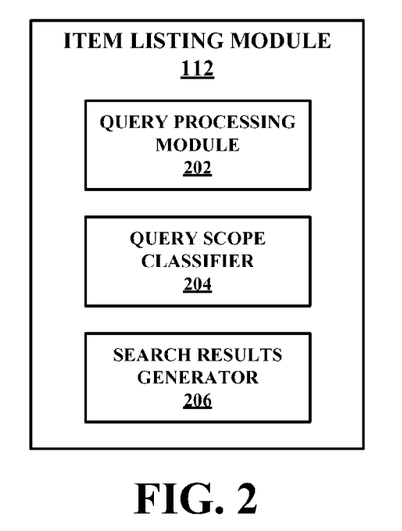
FIG. 2 illustrates a functional block diagram of an embodiment of an item listing presentation management module.

FIG. 2 illustrates one embodiment of an item listing presentation management module 112. The item listing presentation management module 112 provides the logic used to assign a ranking score to item listings that satisfy a search query, and to use the ranking score to determine the order of item listings when the item listings are presented in a search results page. In one embodiment, the item listing presentation management module 112 has a query processing module 202, a query scope classifier module 204, and a search results generator 206.

The query processing module 202 processes a query to identify a set of item listings where each item listing is associated with an item or service being offered for sale and assigned to a leaf-level category. The query scope classifier 204 determines a scope of the query based on a dictionary of queries and a length of the query when the query is not found in the dictionary. The query scope classifier 204 then identifies one or more categories based on the scope of the query. The search results generator 206 presents a search results page with the item listings from the identified one or more categories. In one embodiment, the search results page are presented with the item listings ordered based in part on the category boost score for the leaf-level category from the identified categories.

Figure 3:
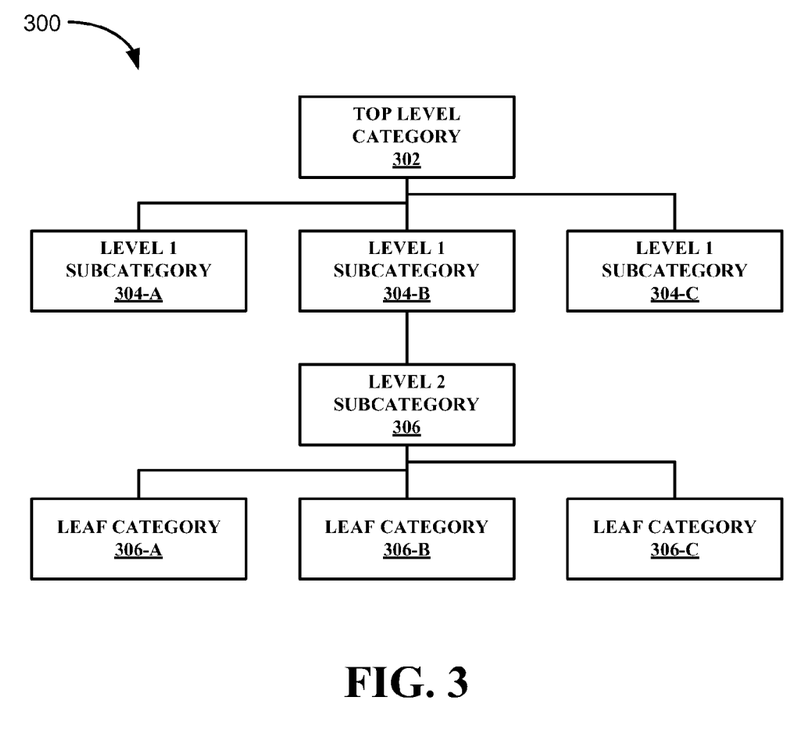
FIG. 3 illustrates an example of a tree-like hierarchy of categories for use with an on-line marketplace or trading application.

Consistent with some embodiments of the invention, an online e-commerce or trading platform facilitates transactions between buyers and sellers of goods and services. The trading platform enables a seller to generate an item listing describing the good or service being offered. When the item listing is first generated, the seller selects or otherwise designates a leaf-level category to which the item is assigned. For example, if the item is a portable music player, the seller may select the leaf-level category that best corresponds with portable media players. A leaf-level category is a sub-category of a tree-like hierarchy of categories that does not itself have any additional child sub-categories. For instance, FIG. 3 illustrates an example of a tree-like hierarchy of categories 300, consistent with some embodiments of the invention. As shown in FIG. 3, there is one top-level category 302, which has three direct Level 1 sub-categories 304-A, 304-B and 304-C. Although the tree-like structure 300 may have several top level categories and any number of intermediate level subcategories and leaf-level categories, for purposes of conveying an understanding of the inventive subject matter, the tree-like structure of FIG. 3 is shown to include only one top level category 302, three Level 1 sub-categories 304-A, 304-B and 304-C, one Level 2 subcategory 306 and five individual leaf-level categories 306-A, 306-B, and 306-C.

Consistent with some embodiments of the invention, an online e-commerce or trading platform includes an item listing presentation management module 112 that presents search results (e.g., item listings) in a search results page, such that the search results are ordered based on a ranking score assigned to each search result. The ranking score itself may have several component scores or factors, such that the ranking score for each search result (e.g., item listing) is calculated as the sum of the component scores, or in some cases the product of the various factors. In some embodiments, one component score or factor is a category boost score or factor that, for a particular query, increases the ranking score for item listings that have been assigned to certain sub-categories or leaf-level categories. For instance, if a user enters a particular search term, such as "16 GB iPod Touch", the item listings assigned to certain leaf-level categories are more likely to be selected from the search results page. Accordingly, for the particular search term or terms, the item listings associated with certain categories have their ranking scores boosted, or increased, by inclusion of a category boost score. Continuing with the example search term, "16 GB iPod Touch," item listings assigned to certain leaf-level categories, such as "MP3 Players," are more likely to be selected than item listings assigned to other categories, such as "Accessories." In contrast to some conventional search algorithms which boost or increase the ranking score for all item listings in the dominant top-level category, consistent with some embodiments of the invention, only item listings assigned to the most relevant sub-categories or leaf-level categories from identified categories based on the scope of the query are given a boost or increase to their ranking scores, and thus presented more prominently in the search results page.

Figure 4:
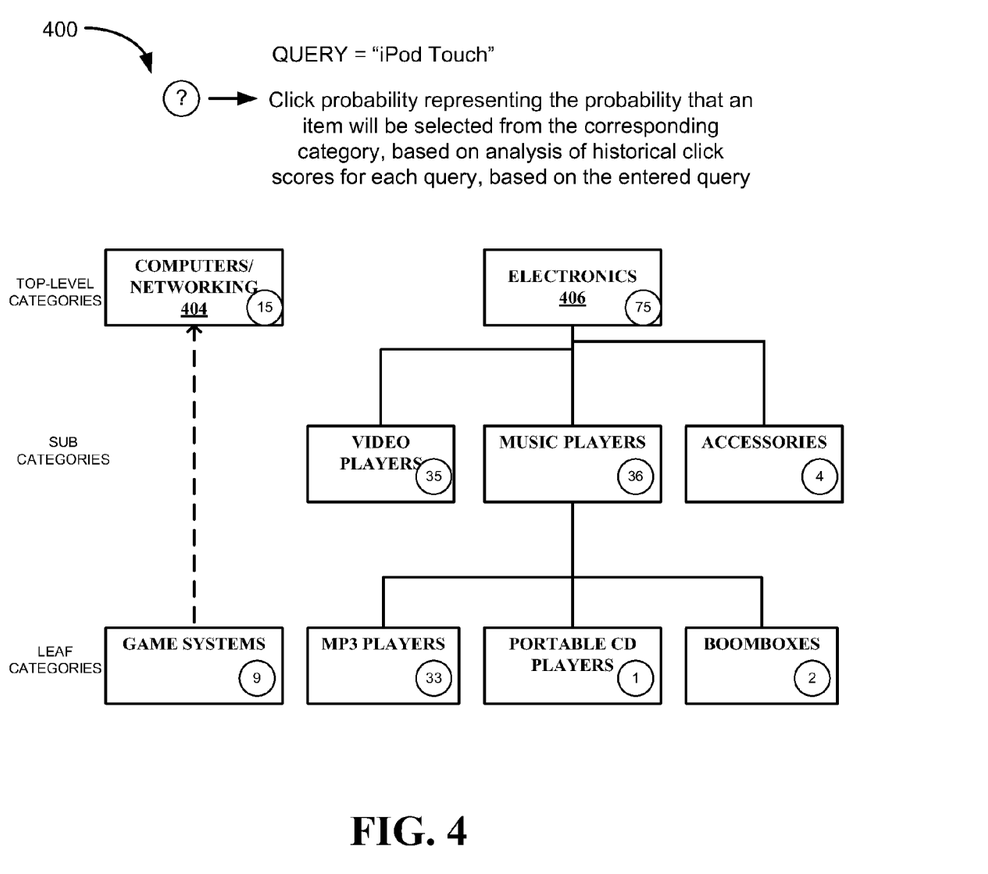
FIG. 4 illustrates an example of a tree-like hierarchy of categories for use with an e-commerce or trading application, and includes for each category a click probability score for a given query.

FIG. 4 illustrates an example of a hierarchical tree-like category structure 400 with click probability scores for a particular query 402. Once the scope of the query 402 has been determined, categories for the search can be identified. The hierarchical tree-like structure 400 represents an example of a category structure for use with an online trading or ecommerce platform. As illustrated in FIG. 4, the hierarchical tree-like structure 400 shows categories to which item listings are assigned, and the categories are shown with their corresponding click probability scores for the user-entered query, "iPod Touch." In the example of FIG. 4, the scope of the query "iPod Touch" has been determined to be specific and thus the corresponding category has been identified as electronics 406. In this example, two top-level categories are shown "Computers/Networking" 404 and "Electronics" 406. The numbers enclosed in circles represent the click probability scores for the corresponding categories for the particular search query—"iPod Touch." The click probability scores are derived by analyzing historical click data detected and captured via the click tracking module. Accordingly, in the example of FIG. 4, based on historical click data, the probability that a user will select an item listing associated with the leaf-level category "MP3 Players" is thirty-three percent, as compared with the one percent probability that the user will select an item listing in the leaf-level category "Portable CD Players."

In some embodiments, the click tracking module stores raw data, such that the click probability scores need to be computed, in real time when processing a query or when a user is browsing item listings by category. Computing the click probability scores involves dividing the number of clicks (or, events) for a particular category by the total number of all clicks (or, events) for all categories, for the particular query. In some embodiments, the click probability scores are pre-computed on a periodic basis.

In some conventional ranking algorithms, only the top-level identified category is considered when attempting to identify the most relevant item listings for a given query. However, by selecting item listings in the dominant top-level category (e.g., in this case, "Electronics"), many item listings assigned to leaf-level categories that are not particularly relevant in light of the search terms will be included in the search results. For instance, referring to FIG. 4, for the query, "iPod Touch", presenting in the search results page item listings generally selected from the top-level category, "Electronics," would result in including item listings assigned to leaf-level categories that are typically not relevant—such as, item listings assigned to leaf-level categories, "Portable CD Players" and "Boomboxes." If it turns out that the number of item listings assigned to one of these irrelevant leaf-level categories is significantly greater than the number of item listings in a relevant category, the overall mix of search results is likely to include a significant number of item listings that are not likely to be relevant and thus not likely to be selected by a potential buyer who is viewing the search results. As such, consistent with some embodiments of the invention, the item listings that are assigned to a predetermined number of sub-categories, or leaf-level categories, with the highest click probably score are given a boost to their ranking score by including a category boost factor or score in the algorithm used to assign each item listing a ranking score.

Figure 5:
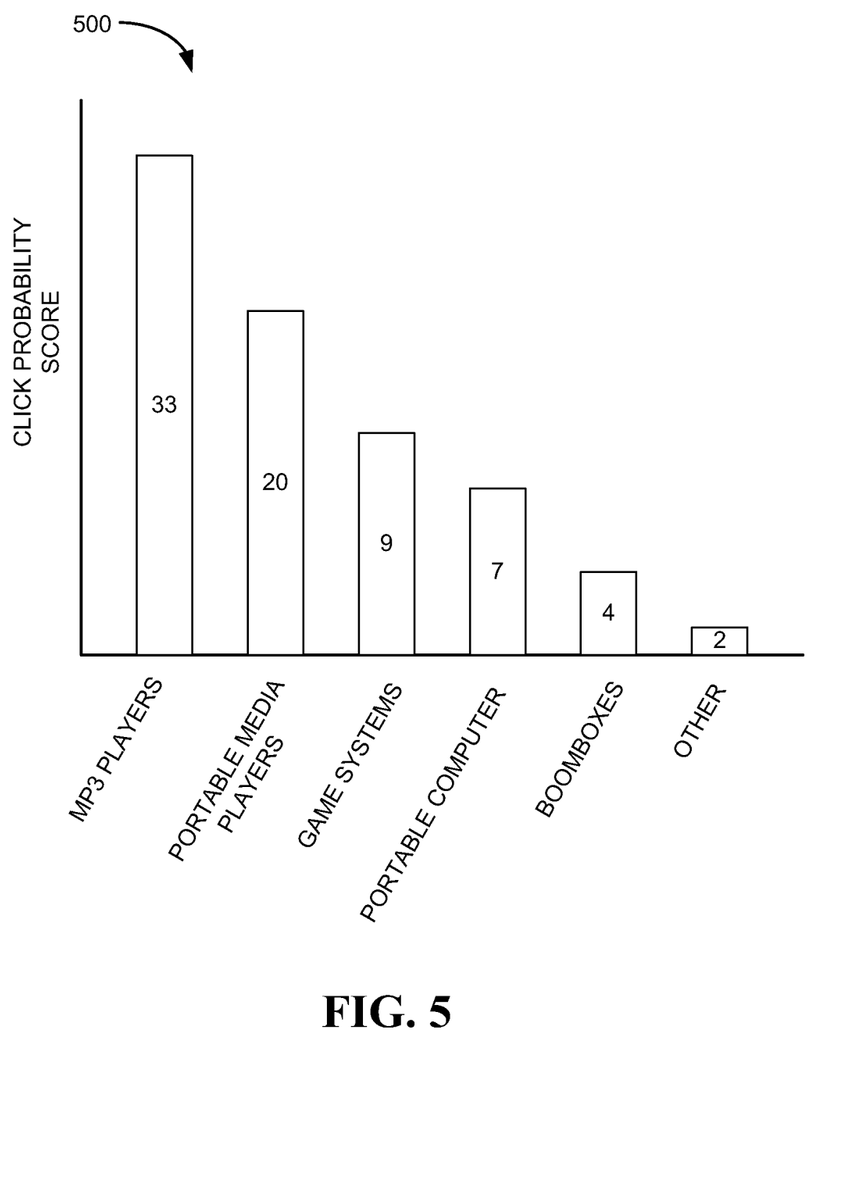
FIG. 5 illustrates the method operations for a method of processing a query and assigning to the search results of the query a category boost score that effects the position of each item listing in the search results page.

FIG. 5 illustrates an example bar chart 600 showing the click probability scores for several categories, for the query, "iPod Touch", consistent with some embodiments of the invention. The click probability scores shown in the bar chart of FIG. 5 are generally consistent with the click probability scores assigned to the categories in the tree-like hierarchy shown in FIG. 4. Accordingly, the category "MP3 PLAYERS" has the highest click probability score for the query "iPod Touch", with a score of thirty-three. The next highest click probability score is associated with the leaf-level category, "PORTABLE MEDIA PLAYERS." Consistent with embodiments of the invention, when item listings are presented to a potential buyer, item listings in a certain predetermined number of categories with high click probability scores are promoted by including in the ranking algorithm a category boost factor.

Figure 6:
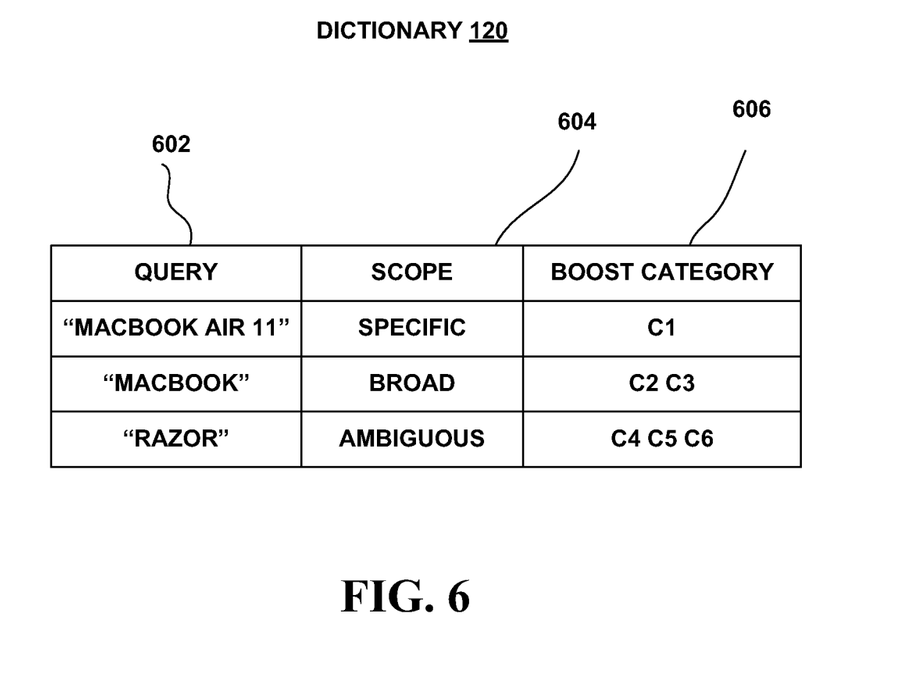
FIG. 6 illustrates a block diagram illustrating one embodiment of a data structure for a dictionary.

FIG. 6 illustrates a block diagram of a data structure for a dictionary 120. The dictionary 120 includes queries 602, scopes 604, and identified or boost category 606. When a seller lists an item, a query associated with the item is stored along with the seller selected category. For example, a seller may list an item as "macbook air 11" in the seller-selected category C1. Because the query exceeds a predetermined number of keywords, the scope of the query may be considered as specific. In another example, a "macbook" query may be considered broad. The broad query of "macbook" may be associated with identified categories C2 and C3. In another example, a "razor" query may be considered ambiguous. The ambiguous query of "macbook" may be associated with identified categories C4, C5 and C6.

Figure 7:
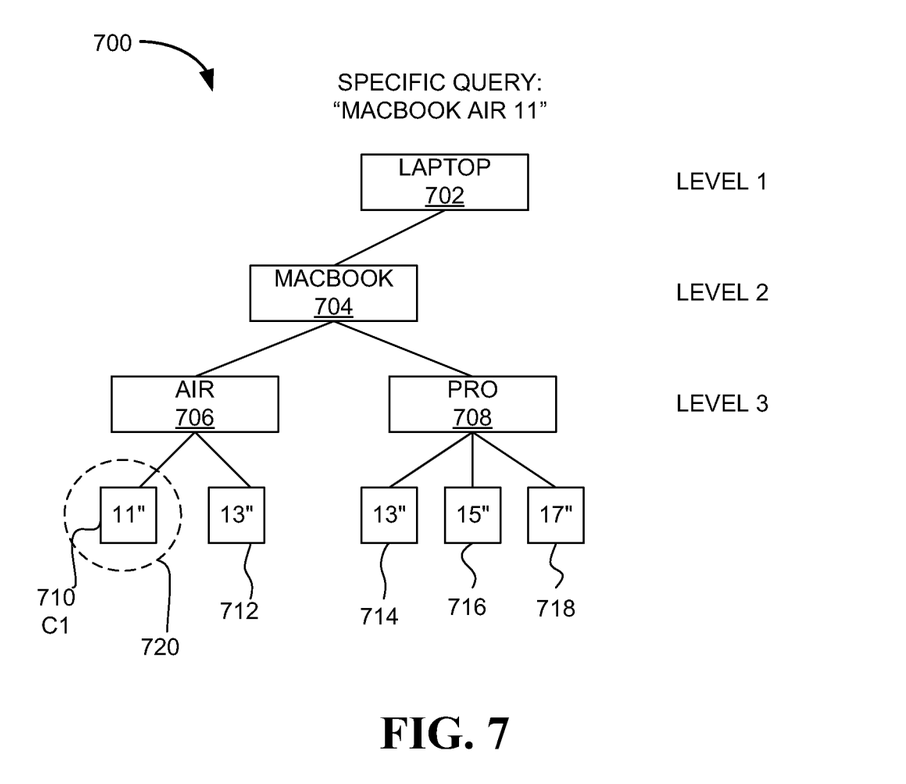
FIG. 7 illustrates an example of a specific query in a tree-like hierarchy of categories for use with an on-line marketplace or trading application.

FIG. 7 illustrates an example of a hierarchical tree-like category showing a specific query: "Macbook air 11". There is one Level 1 sub-category 702 (laptop), which has among others sub-categories, a Level 2 sub-category 704 (macbook). The Level 2 sub-category 704 has among other sub-categories, two Level 3 sub-categories 706 and 708. Level 3 sub-category 706 (air) has two sub-categories 710 (11") and 712 (13"). Level 3 sub-category 708 (pro) has three sub-categories 714 (13"), 716 (15"), 718 (17"). Although the tree-like structure 700 may have several top level categories and any number of intermediate level subcategories and leaf-level categories, for purposes of conveying an understanding of the inventive subject matter, the tree-like structure of FIG. 7 is shown to include only one Level 1 sub-categories, one Level 2 sub-category, two Level 3 sub-categories, and five individual leaf-level categories 710, 712, 716, 718. Because the scope of the query has been determined to be specific based on the length and number of keywords, the search results will be limited to the scope 720 that includes sub-category C1.

Figure 8:
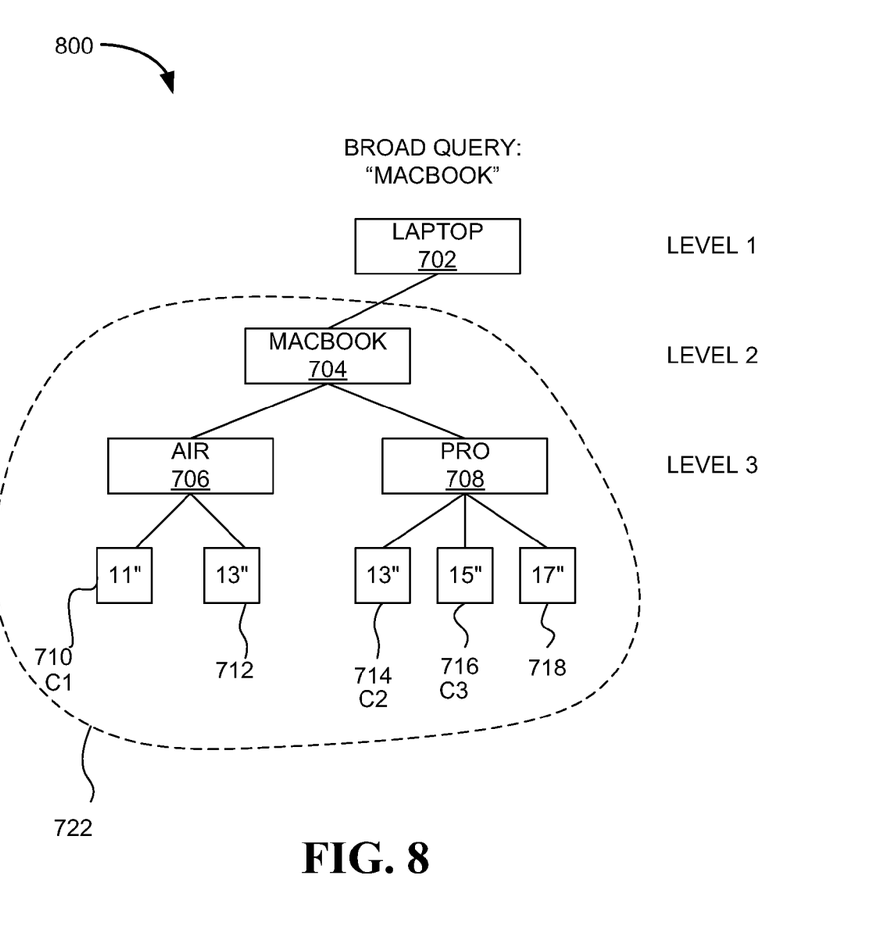
FIG. 8 illustrates an example of a broad query in a tree-like hierarchy of categories for use with an on-line marketplace or trading application.

FIG. 8 illustrates an example of a hierarchical tree-like category showing a broad query: "Macbook". Because the scope of the query has been determined to be broad based on the length and number of keywords (greater than a predetermined number of keywords and the keywords are associated with one dominant category), the search results will be limited to the scope 722 stemming from a single sub-category "macbook" 704 that includes sub-categories 710, 712, 714, 716, and 718. Based on the statistical analysis, sub-categories C1, C2, and C3 are the most dominant leaf-categories within the single sub-category 704. In other words, items from leaf-categories C1, C2, and C3 are the most likely to be clicked within scope 722. Items from C1, C2, and C3 will be promoted in the search results.

Figure 9:
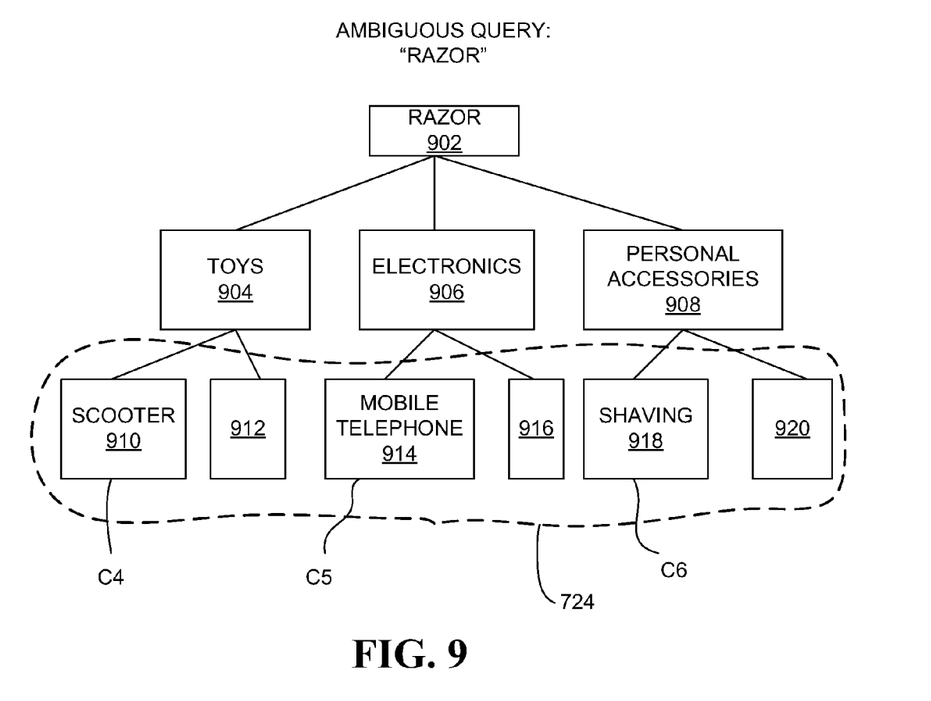
FIG. 9 illustrates an example of an ambiguous query in a tree-like hierarchy of categories for use with an on-line marketplace or trading application.

FIG. 9 illustrates an example of a hierarchical tree-like category showing an ambiguous query: "razor". Because the scope of the query has been determined to be broad based on the length and number of keywords (less than a predetermined number of keywords and the keywords are associated with multiple categories—toys 904, electronics 906, personal accessories 908), the search results will be limited to the scope 724 that includes sub-categories 910, 912, 914, 916, 918 and 920. Based on the statistical analysis, sub-categories C4, C5, and C6 are the most dominant leaf-categories within the multiple sub-categories 904, 906, 908. In other words, items from leaf-categories C4, C5, and C6 are the most likely to be clicked within scope 724. Items from C4, C5, and C6 will be promoted in the search results.

In another embodiment, a distance category between the sub-categories may be used to determine sub-categories to be included in the scope 724.

Figure 10:
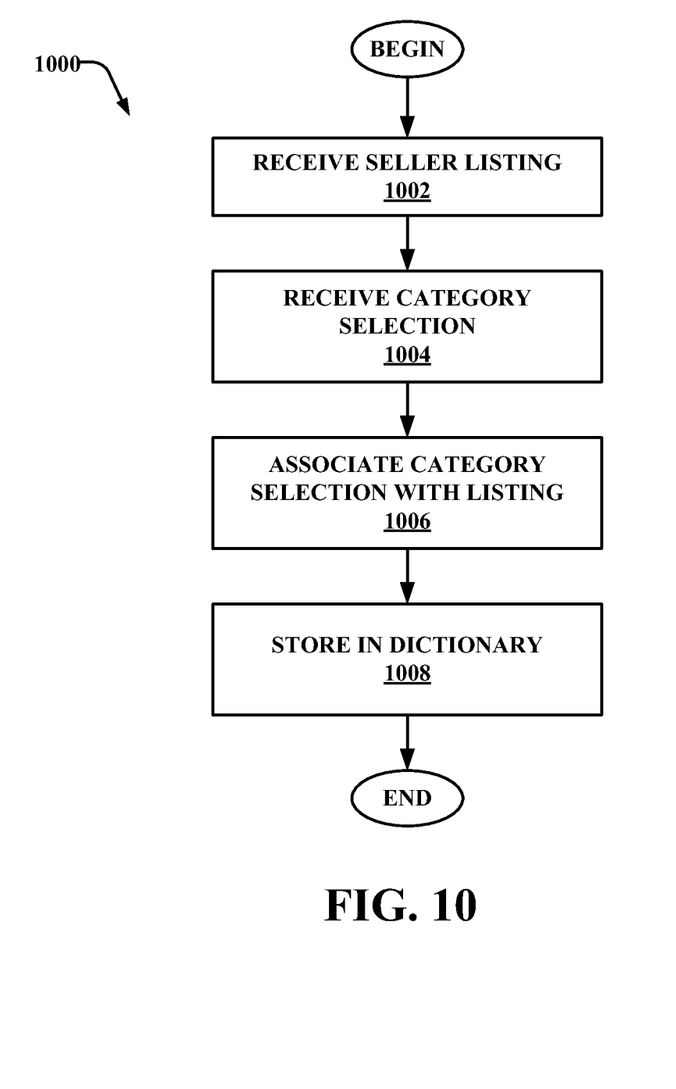
FIG. 10 illustrates a flow diagram of a method for forming entries in a dictionary.

FIG. 10 is a flow diagram illustrating one embodiment of a method for forming entries in a dictionary. At 1002, a seller generates a listing with a description and keywords of the item for sale. At 1004, the seller selects or otherwise designates a leaf-level category to which the item is assigned. A leaf-level category is a sub-category of a tree-like hierarchy of categories that does not itself have any additional child sub-categories. At 1006, the selected leaf-level category is associated with the corresponding keywords and scope. In one embodiment, the scope of the keywords may be determined based on its length or number. At 1008, the selected leaf-level category, the corresponding keywords and scope are stored in the dictionary.

Figure 11:
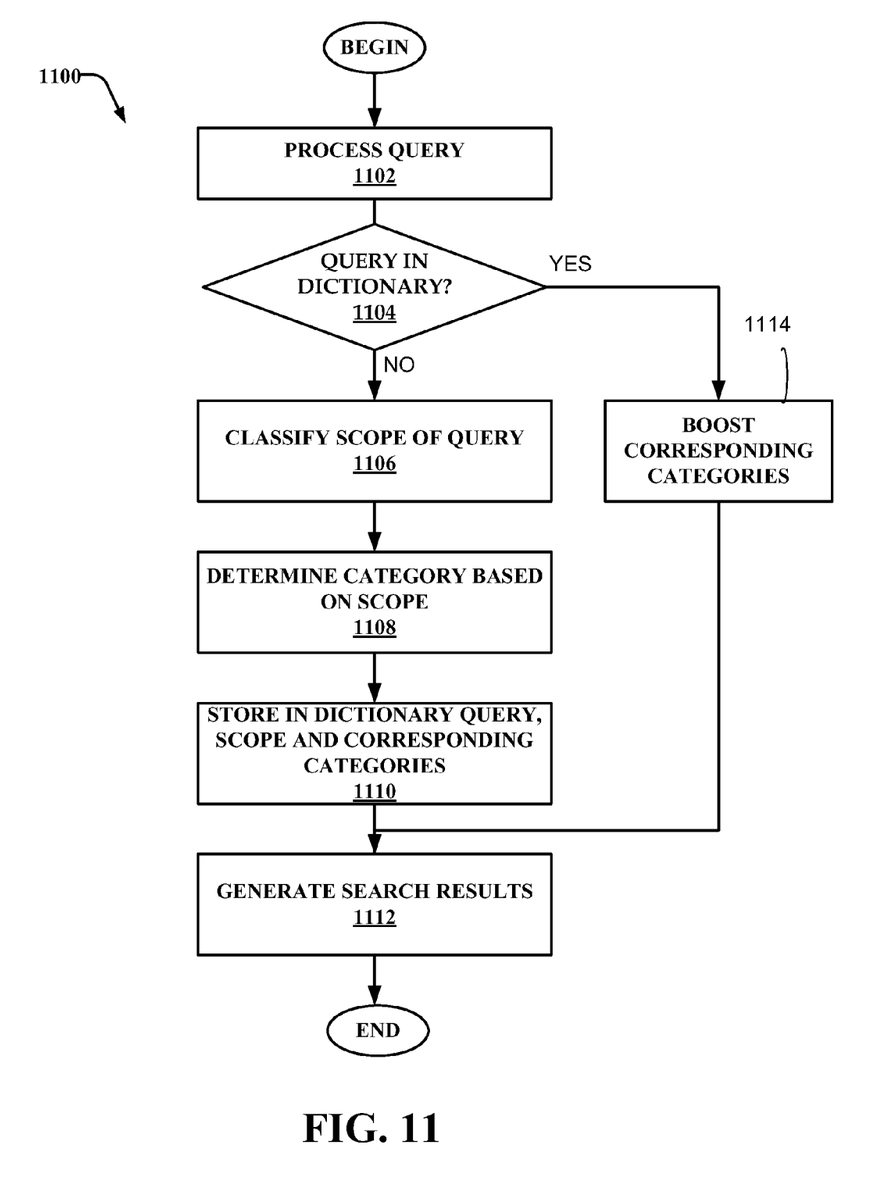
FIG. 11 illustrates a flow diagram of a method for generating search results based on the scope of a query.

FIG. 11 illustrates a flow diagram 1100 of a method for generating search results based on the scope of a query. At 1102, a query is received. At 1104, the system looks up whether the query is associated with any of the keywords listed in the dictionary. If the query matches the keywords in the dictionary, items from the corresponding leaf-level category are promoted at 1114.

If the dictionary does not include the keywords from the query, the scope of the query is determined at 1106 based on the keyword length and category distances. In one embodiment, the scope of the query may include specific, broad, and ambiguous. Once the scope of the query is determined, the sub-categories or leaf-level categories are determined at 1108. At 1110, the keywords from the query, the corresponding scope and identified sub-categories are stored in the dictionary. At 1112, items from the identified sub-categories are promoted in a search results.

Figure 12:
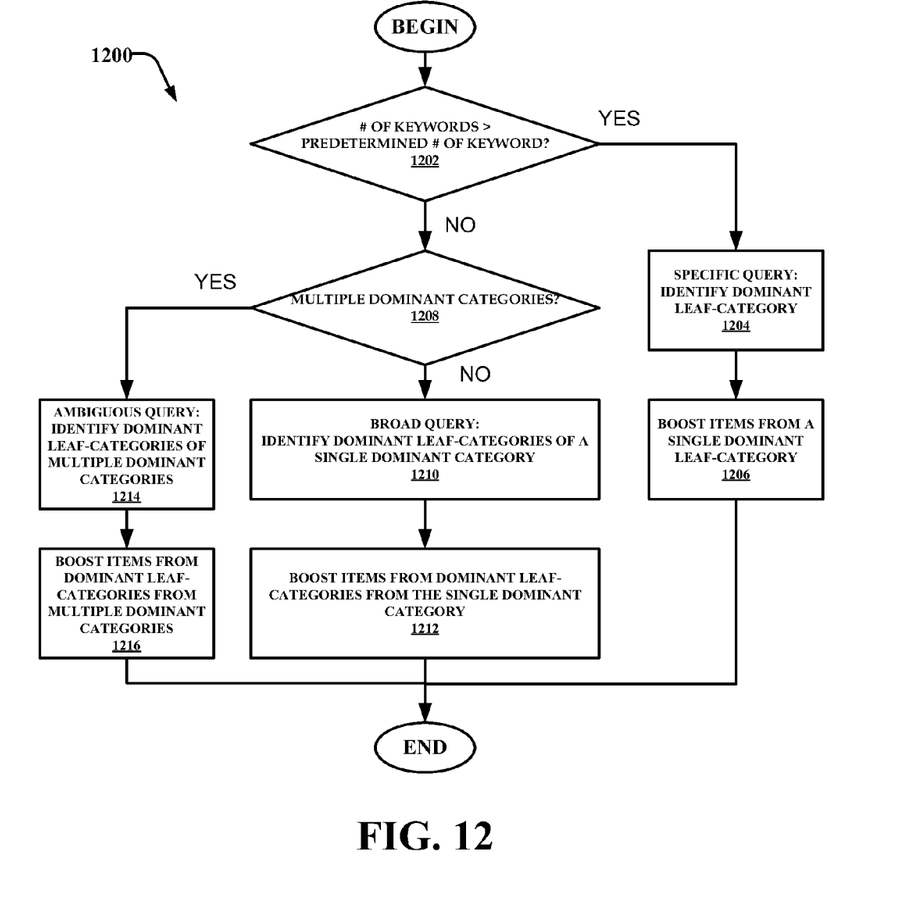
FIG. 12 illustrates a flow diagram of a method for determining the scope of a query.

FIG. 12 illustrates a flow diagram 1200 of a method for determining the scope of a query. At 1202, the number of keywords in the query is compared with a predetermined number of keywords. For example, an average number of keywords in a query may be 1.2 words. It can be deemed that the higher the number of keywords in a query, the more specific the query is. At 1204, when the number of keywords in the query is greater than a predetermined number of keywords, a single dominant leaf-category is identified at 1204 and items from the single dominant leaf-category are promoted via a boost score at 1206.

At 1208, when the number of keywords in the query is less than a predetermined number of keywords, it is determined whether the keywords are associated with multiple dominant categories ("razor" can be associated with mobile telephone, toys, personal accessories categories; whereas "macbook" is associated with a single dominant category: personal computers).

As such, the query is deemed broad when a single dominant category is associated with the query. Dominant leaf-level categories (e.g. "11-inch macbook air", "13-inch macbook pro", and "15-inch macbook pro") from the single dominant category (e.g. "macbook") are identified at 1210. At 1212, items from the dominant leaf-level categories are promoted in the search results.

At 1214, with multiple dominant categories associated with the keywords, the query is deemed ambiguous. Dominant leaf-level categories (e.g. "scooter", "mobile telephone", and "shaving") from the multiple dominant categories are identified at 1214. At 1216, items from the dominant leaf-level categories are promoted in the search results.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 13:
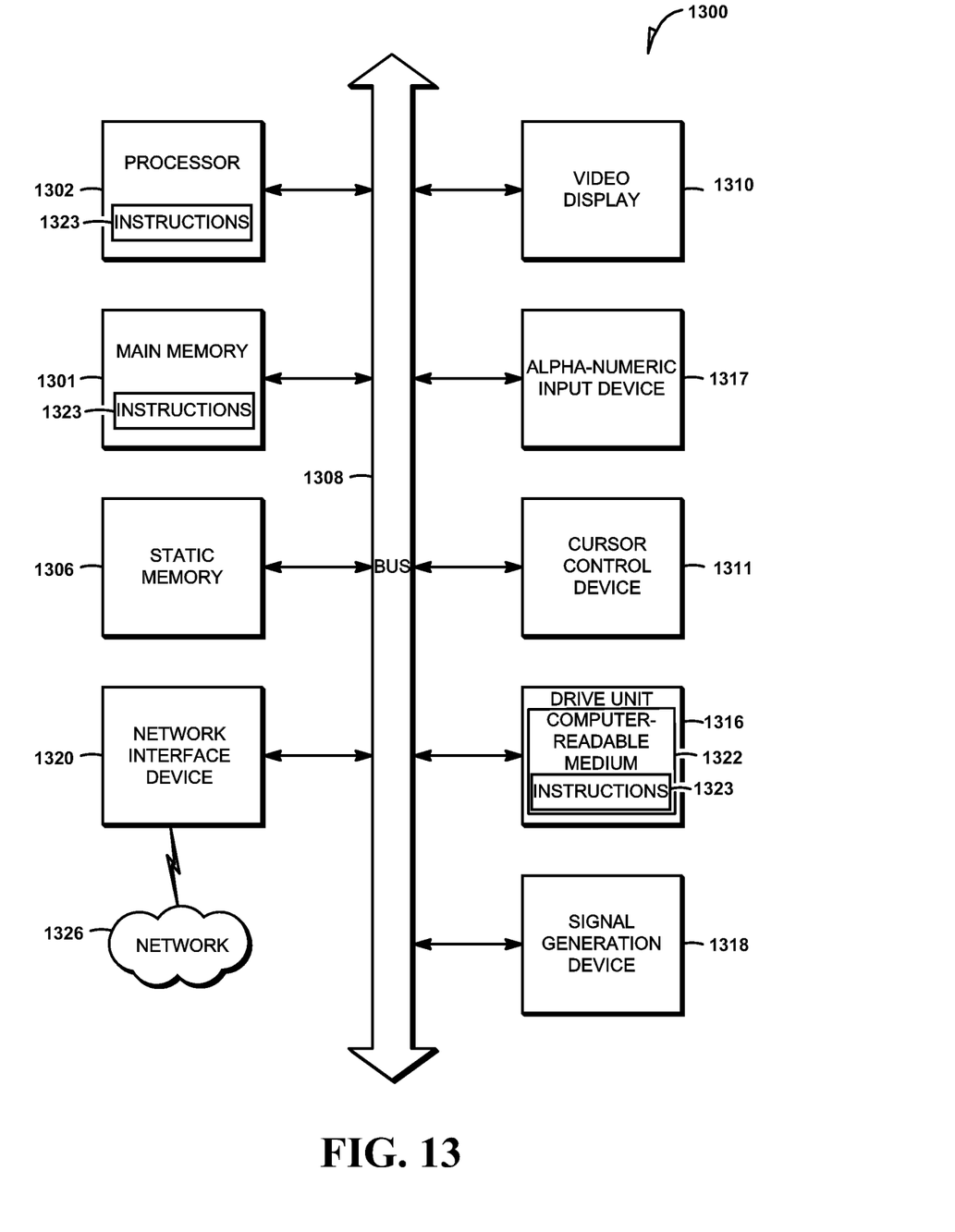
FIG. 13 is a block diagram of a machine in the form of a mobile device within which a set of instructions, for causing the machine to perform any one or more of the methodologies discussed herein, may be executed.

FIG. 13 is a block diagram of a machine in the form of a computing device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1301 and a static memory 1306, which communicate with each other via a bus 1308. The computer system 1300 may further include a display unit 1310, an alphanumeric input device 1317 (e.g., a keyboard), and a user interface (UI) navigation device 1311 (e.g., a mouse). In one embodiment, the display, input device and cursor control device are a touch screen display. The computer system 1300 may additionally include a storage device (e.g., drive unit 1316), a signal generation device 1318 (e.g., a speaker), a network interface device 1320, and one or more sensors 1321, such as a global positioning system sensor, compass, accelerometer, or other sensor.

The drive unit 1316 includes a machine-readable medium 1322 on which is stored one or more sets of instructions and data structures (e.g., software 1323) embodying or utilized by any one or more of the methodologies or functions described herein. The software 1323 may also reside, completely or at least partially, within the main memory 1301 and/or within the processor 1302 during execution thereof by the computer system 1300, the main memory 1301 and the processor 1302 also constituting machine-readable media.

While the machine-readable medium 1302 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1323 may further be transmitted or received over a communications network 1326 using a transmission medium via the network interface device 1320 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method comprising:
   processing a query to identify a set of item listings, each item listing associated with an item or service being offered and assigned to a leaf-level category;
   determining a scope of the query based on a dictionary of queries or a length of the query when the query is not found in the dictionary;
   identifying one or more categories based on the scope of the query; and
   presenting a search results page with the item listings from the identified one or more categories.

2. The computer-implemented method of claim 1 further comprising:
   prior to processing the query, receiving an item listing from a seller;
   associating the item listing with a category selected by the seller; and
   storing in the dictionary, the item listing and the corresponding category selected by the seller.

3. The computer-implemented method of claim 1 further comprising:
   calculating a category boost score for the identified one or more categories for use in determining the order in which the item listings are to be presented in the search results page; and
   presenting the search results page with the item listings ordered based in part on the category boost score for identified one or more categories to which each item listing is assigned.

4. The computer-implemented method of claim 1 wherein determining the scope of the query further comprises:
   determining the scope of the query using a number of keywords in the query.

5. The computer-implemented method of claim 4 further comprising:
   determining that the scope of the query is specific when the number of keywords in the query is greater than a predetermined number of keywords;
   identifying a dominant leaf-category from a category associated with the query; and
   presenting the search results page with the item listings from the identified dominant leaf-category.

6. The computer-implemented method of claim 4 further comprising:
   determining that the scope of the query is broad when the number of keywords in the query is less than a predetermined number of keywords with a single dominant category associated with the query;
   identifying dominant leaf-categories within the single dominant category; and
   presenting the search results page with the item listings from the identified dominant leaf-categories.

7. The computer-implemented method of claim 4 further comprising:
   determining that the scope of the query is ambiguous when the number of keywords in the query is less than a predetermined number of keywords with multiple dominant categories associated with the query;
   identifying dominant leaf-categories within the multiple dominant categories using the category distance between the multiple dominant categories; and
   presenting the search results page with the item listings from the identified dominant leaf-categories.

8. A non-transitory computer-readable storage medium storing a set of instructions that, when executed by a processor, cause the processor to perform operations, comprising:
   processing a query to identify a set of item listings, each item listing associated with an item or service being offered for sale and assigned to a leaf-level category;
   determining a scope of the query based on a dictionary of queries or a length of the query when the query is not found in the dictionary;
   identifying one or more categories based on the scope of the query; and
   presenting a search results page with the item listings from the identified one or more categories.

9. The non-transitory computer-readable storage medium of claim 8 further comprising:
   prior to processing the query, receiving an item listing from a seller;
   associating the item listing with a category selected by the seller; and
   storing in the dictionary, the item listing and the corresponding category selected by the seller.

10. The non-transitory computer-readable storage medium of claim 8 further comprising:
    calculating a category boost score for the identified one or more categories for use in determining the order in which the item listings are to be presented in the search results page; and
    presenting the search results page with the item listings ordered based in part on the category boost score for identified one or more categories to which each item listing is assigned.

11. The non-transitory computer-readable storage medium of claim 8 wherein determining the scope of the query further comprises:
    determining the scope of the query using a number of keywords in the query.

12. The non-transitory computer-readable storage medium of claim 11 further comprising:
    determining that the scope of the query is specific when the number of keywords in the query is greater than a predetermined number of keywords;
    identifying a dominant leaf-category from a category associated with the query; and
    presenting the search results page with the item listings from the identified dominant leaf-category.

13. The non-transitory computer-readable storage medium of claim 11 further comprising:

determining that the scope of the query is broad when the number of keywords in the query is less than a predetermined number of keywords with a single dominant category associated with the query;

identifying dominant leaf-categories within the single dominant category; and presenting the search results page with the item listings from the identified dominant leaf-categories.

14. The non-transitory computer-readable storage medium of claim 11 further comprising:

determining that the scope of the query is ambiguous when the number of keywords in the query is less than a predetermined number of keywords with multiple dominant categories associated with the query;

identifying dominant leaf-categories within the multiple dominant categories using the category distance between the multiple dominant categories; and presenting the search results page with the item listings from the identified dominant leaf-categories.

15. A system for an item listing presentation management, the system comprising:

a query processor configured to identify a set of item listings, each item listing associated with an item or service being offered for sale and assigned to a leaf-level category;

a query scope classifier configured to determine a scope of the query based on a dictionary of queries or a length of the query when the query is not found in the dictionary and identify one or more categories based on the scope of the query; and a search results generator configured to present a search results page with the item listings from the identified one or more categories.

16. The system of claim 15 wherein the query scope classifier is configured to receive an item listing from a seller, to associate the item listing with a category selected by the seller, and to store in the dictionary, the item listing and the corresponding category selected by the seller.

17. The system of claim 15 wherein the search results generator is configured to calculate a category boost score for the identified one or more categories for use in determining the order in which the item listings are to be presented in the search results page, and to present the search results page with the item listings ordered based in part on the category boost score for identified one or more categories to which each item listing is assigned.

18. The system of claim 15 wherein the query scope classifier is configured to determine the scope of the query using a number of keywords in the query.

19. The system of claim 18 wherein the query scope classifier is configured to determine that the scope of the query is specific when the number of keywords in the query is greater than a predetermined number of keywords, to identify a dominant leaf-category from a category associated with the query, and to present the search results page with the item listings from the identified dominant leaf-category.

20. The system of claim 18 wherein the query scope classifier is configured to determine that the scope of the query is broad when the number of keywords in the query is less than a predetermined number of keywords with a single dominant category associated with the query, to identify dominant leaf-categories within the single dominant category, and to present the search results page with the item listings from the identified dominant leaf-categories.

21. The system of claim 18 wherein the query scope classifier is configured to determine that the scope of the query is ambiguous when the number of keywords in the query is less than a predetermined number of keywords with multiple dominant categories associated with the query, to identify dominant leaf-categories within the multiple dominant categories using the category distance between the multiple dominant categories, and to present the search results page with the item listings from the identified dominant leaf-categories.

* * * * *